United States Patent
Leonardo et al.

(10) Patent No.: US 10,170,886 B2
(45) Date of Patent: Jan. 1, 2019

(54) RGB LASER SOURCE FOR LUMINAIRE PROJECTOR SYSTEM

(71) Applicant: IPG PHOTONICS CORPORATION, Oxford, MA (US)

(72) Inventors: Manuel Leonardo, Santa Clara, CA (US); Igor Samartsev, Westborough, MA (US); Alexey Avdokhin, Southborough, MA (US); Gregory Keaton, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 15/511,826

(22) PCT Filed: Sep. 16, 2015

(86) PCT No.: PCT/US2015/050419
§ 371 (c)(1),
(2) Date: Mar. 16, 2017

(87) PCT Pub. No.: WO2016/044422
PCT Pub. Date: Mar. 24, 2016

(65) Prior Publication Data
US 2018/0233878 A1    Aug. 16, 2018

Related U.S. Application Data

(60) Provisional application No. 62/050,825, filed on Sep. 16, 2014, provisional application No. 62/112,938, (Continued)

(51) Int. Cl.
*G02F 1/37*    (2006.01)
*G02F 1/355*    (2006.01)
(Continued)

(52) U.S. Cl.
CPC ............ *H01S 3/2391* (2013.01); *G02B 27/48* (2013.01); *G02F 1/3551* (2013.01); *G02F 1/37* (2013.01);
(Continued)

(58) Field of Classification Search
CPC .............................. H01S 3/2391; G02B 27/48
See application file for complete search history.

(56) References Cited

U.S. PATENT DOCUMENTS 6,304,237 B1 * 10/2001 Karakawa ............. G02F 1/3532
345/83
7,764,723 B2 * 7/2010 Ovtchinnikov ......... H01S 3/067
372/50.12
(Continued)

OTHER PUBLICATIONS

Y. Zhang, H. Dong, R. Wang, J. Duan, A. Shi, Q. Fang, and Y. Liu, "Demonstration of a home projector based on RGB semiconductor lasers," Appl. Opt. 51, 3584-3589 (2012). (Year: 2012).*
(Continued)

*Primary Examiner* — Rhonda S Peace
(74) *Attorney, Agent, or Firm* — Yuri B. Kateshov, Esq.; Timothy J. King, Esq.

(57) ABSTRACT

An RGB light source for a luminaire projector system includes Red, Green and Blue lasers each outputting a randomly polarized (RP) single mode (SM) light with at least a 4 nm spectral linewidth. The Green laser has a MOPFA-structured pump which outputs a pulsed pump beam at a fundamental wavelength in a 1 μm wavelength range and further includes a SHG. The SHG includes an LBO nonlinear crystal receiving the pulsed pump beam and outputting a train of pulses of BB Green light. The Red laser is configured with a QCW fiber laser pump and a frequency converter with an LBO nonlinear crystal outputting a train of pulses of red light in a 6xx nm wavelength range.

18 Claims, 8 Drawing Sheets

Related U.S. Application Data filed on Feb. 6, 2015, provisional application No. 62/140,911, filed on Mar. 31, 2015.

(51) Int. Cl.

| | |
|---|---|
| *H01S 3/067* | (2006.01) |
| *H01S 3/00* | (2006.01) |
| *H01S 3/16* | (2006.01) |
| *H01S 3/23* | (2006.01) |
| *H01S 3/30* | (2006.01) |
| *G03B 21/20* | (2006.01) |
| *H01S 3/094* | (2006.01) |
| *G02B 27/48* | (2006.01) |

(52) U.S. Cl.
CPC ........ *G03B 21/2033* (2013.01); *H01S 3/0092* (2013.01); *H01S 3/06758* (2013.01); *H01S 3/094046* (2013.01); *H01S 3/1608* (2013.01); *H01S 3/1618* (2013.01); *H01S 3/2308* (2013.01); *H01S 3/302* (2013.01)

(56) References Cited

U.S. PATENT DOCUMENTS

| | | | | |
|---|---|---|---|---|
| 8,615,029 | B2* | 12/2013 | Ovtchinnikov | H01S 5/2036 372/66 |
| 8,711,894 | B2* | 4/2014 | Chuyanov | G02B 6/4206 372/23 |
| 9,667,023 | B2* | 5/2017 | Fomin | H01S 3/06708 |
| 10,008,819 | B2* | 6/2018 | Leonardo | H01S 3/0675 |
| 2018/0203339 | A1* | 7/2018 | Shkurikhin | G05D 25/00 |

OTHER PUBLICATIONS

H. Arabi, S. An and K. Oh, "Fiber optic engine for full color micro projection," 2009 Conference on Lasers & Electro Optics & The Pacific Rim Conference on Lasers and Electro-Optics, Shanghai, 2009, pp. 1-2. (Year: 2009).*

* cited by examiner

Known digital laser projector
3P system

Known digital laser projector
6P system

FIG. 10
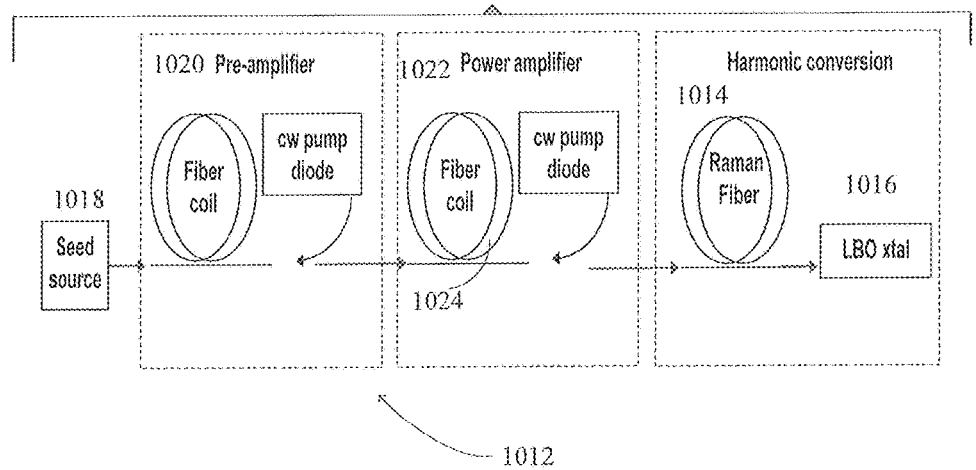
FIG. 11A
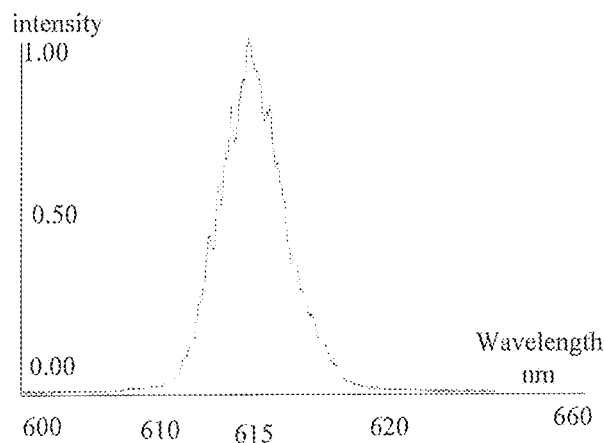
FIG. 11B
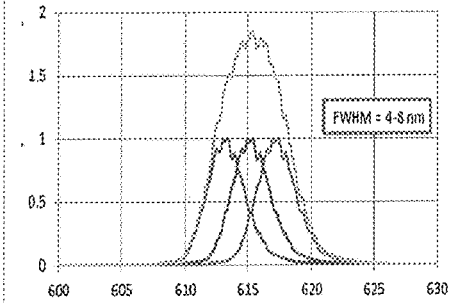
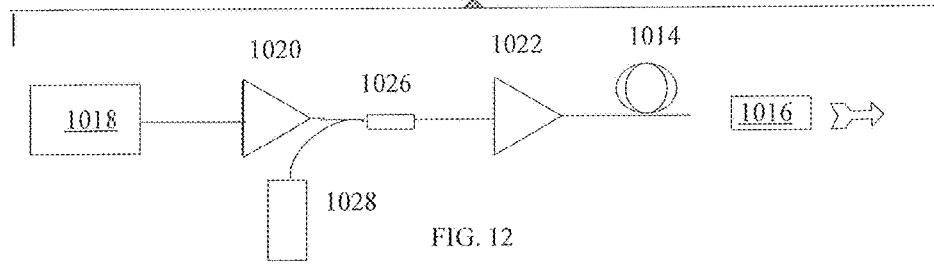
FIG. 12

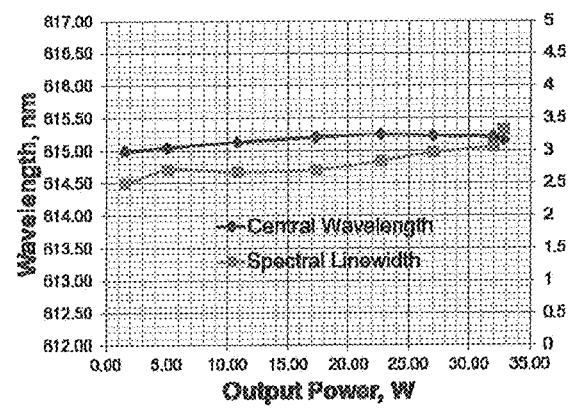
FIG. 17
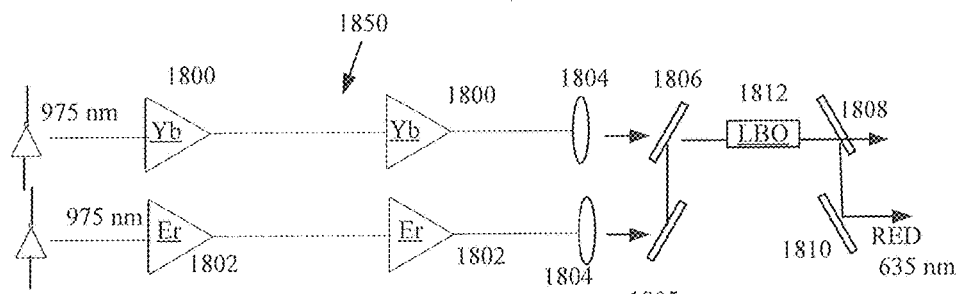
FIG. 18
FIG. 19
FIG. 20
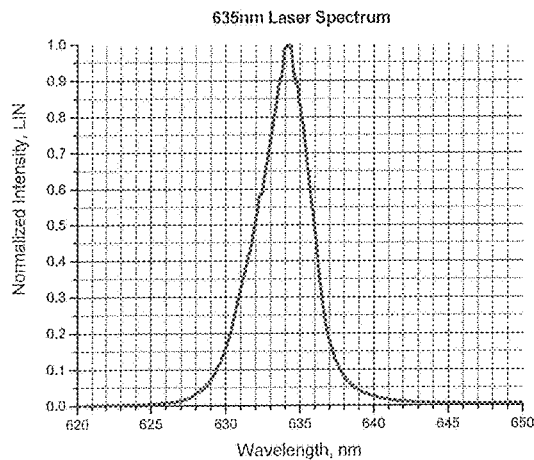
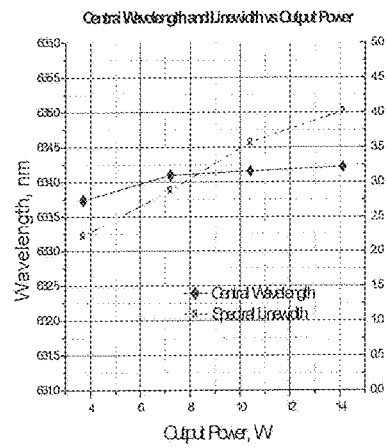

RGB LASER SOURCE FOR LUMINAIRE PROJECTOR SYSTEM

CROSS-REFERENCE TO RELATED APPLICATION

This application is a continuation-in-part of U.S. Provisional Application Nos. 62/050,825, 62/140,911 and 62/112,938 filed with the USPTO on Sep. 16, 2014 and Mar. 31, 2015 and Feb. 6, 2015.

BACKGROUND OF THE INVENTION

1. Field of the Invention

This invention relates to laser-based lighting applications. More particularly, the disclosure relates to high power red, green and blue (RGB) fiber laser-based luminaire systems for projection in digital cinema including giant screens, theme park attractions, museums planetariums and similar indoor and outdoor applications.

2. Background of the Invention

High wall-plug efficiency (WPE) and long lifetimes have made light emitting diodes (LED) the lighting technology of choice for most general lighting and display applications. However, there are emerging needs for which the unique attributes of RGB laser illumination will enable a new class of solid-state light sources.

The first of these is digital cinema. More than 120,000 movie screens now use standardized, digital cinema projectors that show movies from encrypted data files instead of 35-mm film. This conversion to digital was an operational advance for the industry but with a notable technological irony. These state-of-the-art digital projectors still use 60-year old technology—xenon arc lamps—as their light source. Gradually, the arc lamps being replaced by LEDs.

RGB Laser movie projectors, i.e., projectors with a light source in which all the light energy comes from lasers, are a great substitute for LEDs because of the same reasons LEDs are replacing xenon arc lamps—long lifetime and high wall-plug efficiency. But lasers have additional advantages in that they produce ultra-high spatial brightness, i.e., small optical étendue ($mm^2$-steradian) and deliver powers from a very small spot in a nearly collimated beam. This unique optical property enables key capabilities for cinema and ultimately for new kinds of specialty laser lighting: the ability to input nearly unlimited amounts of RGB light into digital projectors and the ability to deliver kilowatts of visible light via efficient, flexible optical fibers. RGB laser illumination, delivered via optical fiber, provides a solution to achieve acceptable brightness through a digital projector. Fiber delivery will enable new projection and lighting capabilities and applications.

Diode lasers are by far the most frequently used light sources for digital cinema because of the improved longevity, and overall spectral and brightness stability. However, only recently diode laser arrays including VCSEL (Vertical Cavity Surface-Emitting Laser) and the like have shown promise to output adequate powers leading to the required brightness. The required brightness for each of RGB colors is a result of a large number of individual laser arrays combined to match the power requirements of the projector's lumen. The increased number of diode lasers poses technical challenges including maintaining the white color balance, high brightness (superior etendue) and speckle reduction.

The wavelength shift and power change of each of RGB laser sources contribute to white color balance instability—one of the most important characteristics of the projectors' technical performance. Known diode laser sources, particularly Green and Red laser diodes, have respective operating wavelengths highly sensitive of temperature changes in the heterojunction and bias current, whereas human eyes is especially sensitive to these wavelength changes. The combined high power diode lasers generate a lot of external heat in addition to the heat produced inside the chip. Although each of red, green and blue diode lasers has rather a different heat/wavelength dependency, invariably respective operating wavelengths increase with higher temperatures. If all lasers even in a single color array are tied together and of a narrow wavelength, which is typical for a diode laser, a shift of the operating wavelength causes the white point and color of the entire projector output to fall out of specification. Furthermore, as the temperature increases, the diode's gain decreases disturbing the color contrast ratio which is a carefully controlled value. To restore the gain, the injection current should be increased but at expense of the central wavelength stability. All of the above require additional control mechanisms that stabilize both the output power and central wavelength which add to the complexity and cost of the laser source.

A second technical challenge stems from the great advantage of lasers—light coherence which is desired from the standpoint of improved color gamut. However, coherence of the laser sources typically causes artifacts such as optical interference and speckle occurring due to the roughness of the screen surface. These interferences lead to a strong additional intensity modulation of the brightness distribution of light scattered from the screen in the eye of the viewer. Broadening a spectral linewidth of the output is one of a few approaches dealing with this problem. However, as mentioned above, diode lasers are known to have an unacceptably narrow linewidth. While the increased number of diode lasers contributes to a linewidth which is somewhat broader than that of a single diode, it is still inadequate to radically minimize speckles. As a consequence, the image quality is diminished to such an extent that the advantages of the laser radiation disappears or that its use hardly brings any technical or economic advantages.

A need therefore exists for a laser-based projection system in which the above discussed challenges are successfully met.

BRIEF DESCRIPTION OF THE DRAWINGS

The features and advantages of the disclosed structure will become more readily available from the following specific description accompanied by the drawings, in which:

FIG. 10 is a general schematic of the Red laser configured with a Raman frequency converter in the disclosed RGB laser source;

FIGS. 11A and 11B are respective computer generated spectra of the Red laser of FIG. 10;

FIG. 12 is an optical schematic of the disclosed Red laser;

FIG. 17 illustrates a graph representing the stability of central wavelength and linewidth of the inventive Red laser operating a 615 nm wavelength;

FIG. 18 is a schematic of a further embodiment of the Red laser with a frequency converter which is based on a sum frequency nonlinear effect;

FIGS. 19 and 20 are computer generated graphs illustrating the characteristics of the Red laser at 635 nm wavelength.

SPECIFIC DESCRIPTION

Figure 1A:
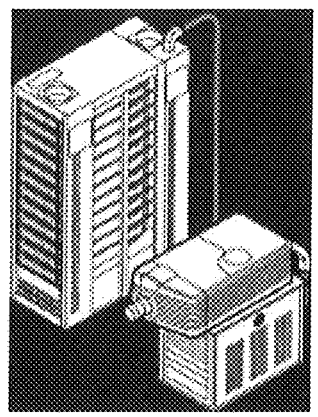
FIGS. 1A and 1B illustrate different configuration of known RGB laser sources.
Figure 1B:
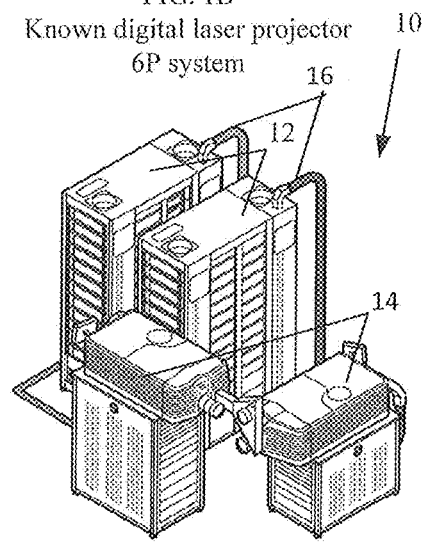

Referring to FIG. 1A, and FIG. 1B, a laser projector system 10 necessarily includes a laser light source 12 and projector with projector head 14. The laser light source 12 may have a variety of configurations and, as shown, includes a rack 16 housing removable laser modules 18 with Green Red and Blue lasers defining three distinct groups. Depending on the configuration of the projector, the architecture may have a single or two projector heads 14.

In operation, light source 12 emits red-green-blue light which, when combined, produce white light coupled into projector by means of a delivery fiber 16. The projector typically includes light guiding and shaping optics and the imaging engine operative to split the white light into red, green, and blue light components. Each light component illuminates a corresponding spatial modulator that forms the image for that color in an array of pixels, after which these components are recombined and projected to a screen (not shown).

Figure 2C:
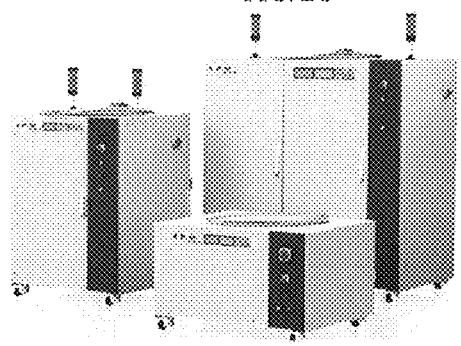
FIGS. 2A through 2C illustrate different configurations of the inventive RGB laser source.
Figure 2A:
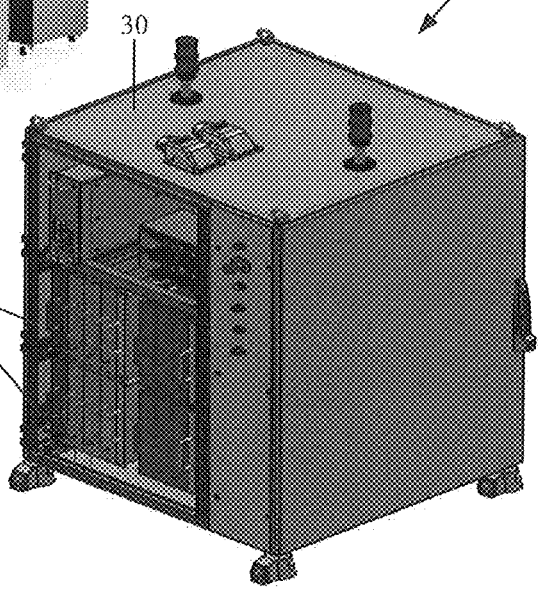
Figure 2B:
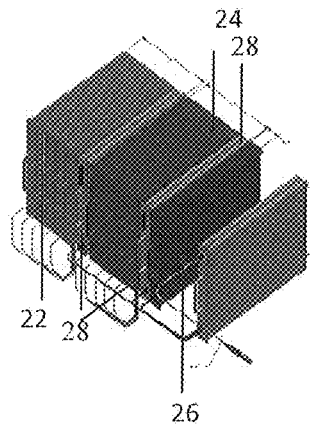

FIGS. 2A and 2B illustrate inventive laser light source 15 with a plurality of displaceable laser modules 20 and a rack for laser modules 20. The laser source 15 includes a main console or cabinet 30 housing, in addition to laser modules 20, electronics and other necessary peripheral components of the laser source.

The cabinet 30 may have a variety of configurations, as shown in FIG. 2C, depending, for example, on the number of laser modules 20. As shown, it has a multi-compartment structure with two compartments receiving respective arrays of laser modules 20, and another compartment getting peripheral components. Each array of laser modules 20 is configured with 3 groups of one or more green fiber lasers 22, red fiber laser 24, their respective signal pumps 28, such as ytterbium (Yb) fiber lasers, and pigtailed blue diode lasers 26.

Figure 3A:
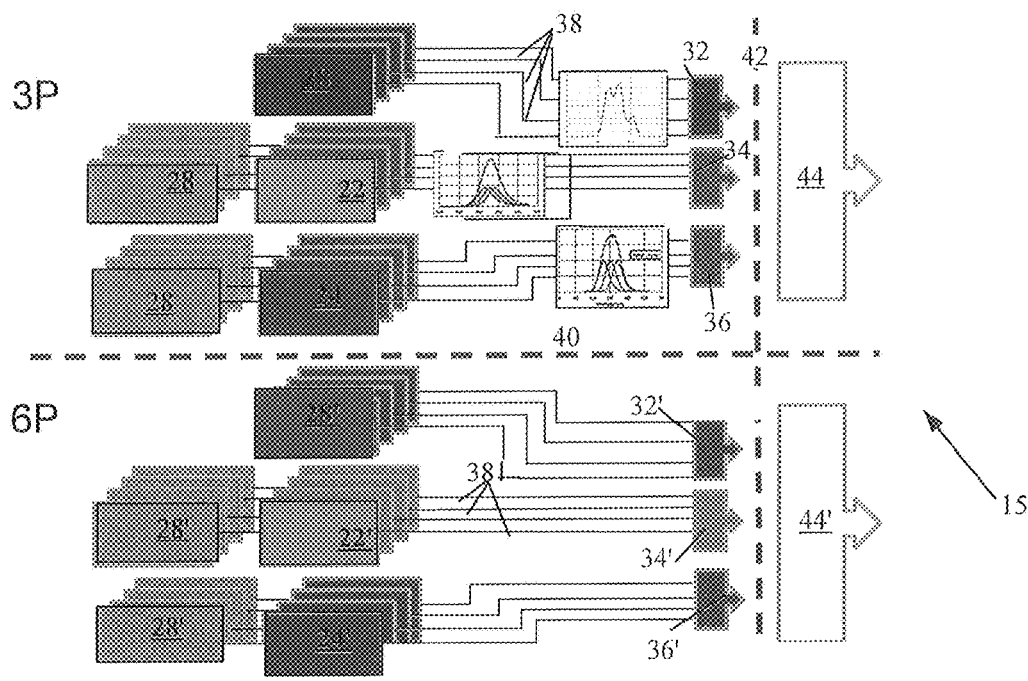
FIGS. 3A and 3B illustrate respective architectures of the inventive RGB laser source.

FIG. 3A illustrates one of the inventive configurations of laser source 15. Before describing individual components of the shown system, it is necessary to note that the inventive source does not necessarily have to be used for 3D visual systems in which six primary colors (6P) are combined. It may very well function as a source for a 2D system by simply utilizing only one array of RGB lasers emitting respective three primary colors (3P).

The presence of two arrays of laser modules emitting 6 primary colors (6P) for a 3D system can be explained by stereopsis—the visual process that allows two eyes to see different images, preferably, but not necessarily simultaneously, which are slightly spectrally offset from one another. The human brain forms a single mental image, complete with accurate depth perception.

Returning to FIG. 3A, fiber combiners 32, 34 and 36 receive respective outputs from blue, green and red groups of lasers 28, 22 and 24 respectively, whereas the other array of lasers 28', 22' and 24' emit respective outputs combined in fiber combiners 32', 34' and 36'. The light is delivered by respective delivery fibers 38. The phantom red line 40 separates one array of laser modules from the other, whereas phantom line 42 defines the periphery of the cabinet. Accordingly, all other components including RGB combiners 44 and 44', which are configured to combine primary colors and output white light, are mounted outside the cabinet and preferably in the projector.

Figure 3B:
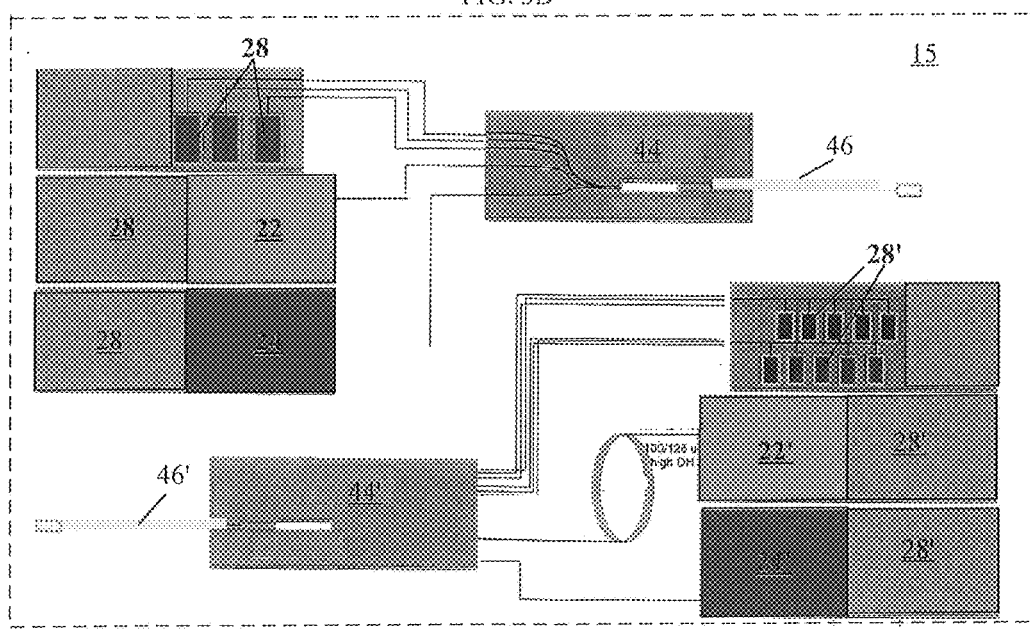

FIG. 3B illustrates the inventive laser source with an architecture slightly different from that of FIG. 3A. In particular, in contrast to light source 15 of FIG. 3A, here light source 15 is configured with RGB fiber combiners 44, 44' mounted in cabinet 30 of FIGS. 2A and 2C. Accordingly, the light emitted from light source 15 configured in accordance with this figure is white light which is guided along respective feed fibers 46 and 46' outside the cabinet.

In general, at the very minimum, the requirements applied to the output of projector system 10, among others, include:
High power providing the requisite brightness;
Broad spectral linewidth successfully minimizing the speckle effect; and
Stable central wavelength independent from temperature and diode bias current fluctuations.

The performance of projector system 10 is only as good as the performance of each of RGB laser sources individually. The following discussion teaches the inventive structure by disclosing the inventive Green, Red and Blue lasers each of the RGB lasers separately.

Green Laser

Referring to FIGS. 4-7 disclosed broadband (BB) Green laser 22 is a compact, robust, conversion- and cost-efficient structure based on type-I and type-II SHG which generates pulsed Green light. The Green laser 15 is operative to output a pulsed output in a nanosecond-picosecond wavelength range, a spectral linewidth $\Delta\lambda$ exceeding 3 nm at Full Width at Half Maximum (FWHM) at the desired central wavelength within a 520-545 nm range, and with the conversion efficiency ranging between 40% and 70%. Each of the architectures of the disclosed Green laser 15 of FIGS. 4-7 includes a signal light pump operative to emit a randomly polarized, broadband (BB), single mode (SM) signal pump light. Each of the architectures of the disclosed Green laser also utilizes a second harmonic generator (SHG) having a single-pass or multi-pass conversion scheme to generate Green light in a 5xx nm wavelength range, with a 520-540 nm range being particularly desirable.

The signal pump 418-718 utilized in all of the embodiments of respective FIGS. 4-7 has a master oscillator power fiber amplifier (MOPFA) configuration including a semiconductor (or any other configuration) oscillator and an ytterbium (Yb) fiber laser amplifier. The MOPFA configuration has quite a few advantages. With the oscillator typically configured as a single diode laser, the modulation of bias current provides fast tunability of a central wavelength in a 1030-1120 nm wavelength. Having the single diode laser also provides the stability of the selected central wavelength. The Yb fiber amplifier is configured as a broadband fiber laser. The utilization of the fiber amplifier considerably increases the output power of pump signal light resulting in a high brightness, low noise output.

As an exemplary structure, signal light pump 418-718 may be configured with an adjustable pulse duration to provide of up to 1 mJ of pulse energy at variable pulse durations ranging in a ps-ns range. The repetition rate range may be adjusted from 30 to 1 MHz. The all fiber format allows for the adjustment of pulse energy and/or pulse repetition rate without affecting any of the output beam parameter $M^2<3$. Preferably, $M^2$ is less than 1.5 and stable spectral linewidth $\Delta\lambda$ may be obtained within a 10 nm and 25 nm range at FWHM. With such a good $M^2$ value, the signal pump light is further referred to as low mode (LM) or substantially SM or simply SM light. The pump source 418-718 further includes a delivery fiber 420-720 guiding an output infrared BB SM pump beam to a laser head 422-722. The latter is configured with a housing encasing guiding and collimating optics so as to output collimated, randomly polarized BB signal pump light.

Figure 4:
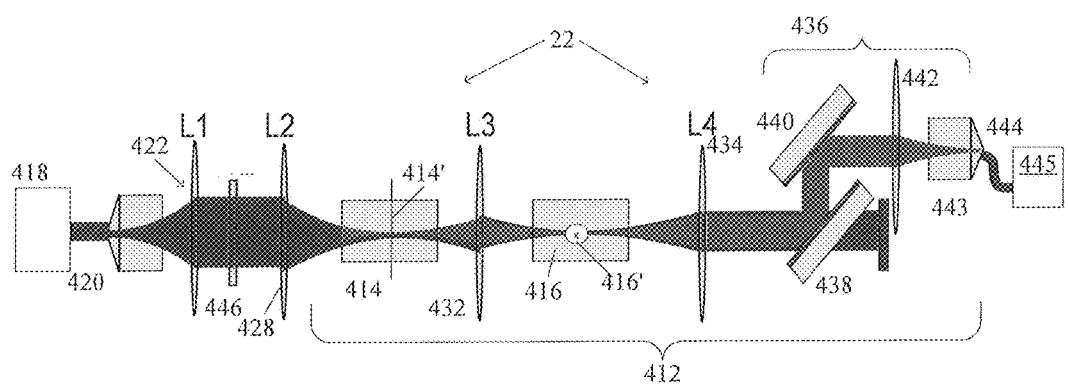
FIGS. 4-7 illustrate respective inventive configurations of the Green laser of the disclosed RGB laser source.

Turning specifically to FIG. 4, SHG 412 is configured with a single pass conversion scheme including spaced upstream 414 and downstream 416 nonlinear type I crystals, such as lithium triborate (LBO). As shown in FIG. 1, axes 414' and 416' of respective output and downstream crystals 414, 416 extend in mutually perpendicular planes. Accordingly, a beam of Green light originally generated in upstream crystal 414 propagates through downstream crystal 416, which generates secondary Green light, unaffected.

The pump signal light from Yb fiber laser 418 is incident on an input focusing lens 428 which is configured to focus the pump beam so that its waist diameter is smaller than 40 micron with the Rayleigh range being smaller than the length of the crystal. The latter allows overcoming the intrinsically narrow spectral acceptance of a nonlinear crystal so that the spectral linewidth of Green light is solely limited by a linewidth of pump signal light. With so tightly focused pump signal light, its peak intensity reaches very high levels of up to hundreds kilowatts which was proved to be not a detriment to the crystal's integrity. The small length of upstream LBO crystal 414 does not allow tightly focused light to greatly diverge which leads to a relatively long interaction length between the pump and Green waves that along with a high peak intensity so necessary for high SHG efficiency, as explained above.

Using the standard terminology, the wave which polarization is parallel to the principle axis of the selected plane in the biaxial LBO crystal is called here ordinary (o), while the other wave with a polarization orthogonal to the principle axis is referred to as extraordinary (e). Only the ordinary wave of the IR pump light in type I LBO crystal 414 partakes in the generation of Green light. Hence in order to use the extraordinary wave which originally does not participate in a conversion process in the upstream type I crystal, it is necessary that a downstream type I LBO crystal 416 be positioned so that axis 416' be turned at 90° relative to axis 414' of upstream LBO crystal 414.

In particular, the generated Green and unconverted signal pump light are further incident on a first intermediary focusing lens 432 configured to focus the incident beam within the bulk of downstream LBO crystal 416 in the same manner as disclosed above. The originally generated Green light propagates through downstream crystal 416 unhindered. However, the original extraordinary pump wave now converts to another, secondary Green light beam at efficiency exceeding 40%. Thereafter, the output of downstream crystal 416 is collimated in an intermediary collimator 434 to enter an output collimating unit 436 by coupling into a fiber 444 which delivers the cumulative Green light to the destination point.

The output collimating unit 436 may have a variety of configurations. As shown, the collimated beam propagates along the light path and is incident on a wavelength discriminator 38 which is configured, for example, as a dichroic mirror transparent to the unconverted in downstream crystal 416 pump signal beam at the fundamental wavelength. The cumulative Green light with an average power equal to the sum of generated Green beams towards another high reflectivity reflector 440 and is eventually guided to a downstream focusing length 442. Finally, the focused Green light is incident on collimator 443 and is further coupled into the delivery fiber 444 guiding it to the destination point, which can be, for example, a giant screen 445.

To minimize polarization-related noise in the output Green light a depolarizer 446, configured from a birefringent material, receives the collimated pump light between input collimating unit 424 and input focusing lens 428. As known, the collimated BB, SM randomly polarized signal pump IR light still possess a small degree of well-defined polarization which, if not eliminated, eventually generates unwanted noise in the output signal. The depolarizer 446 minimizes it. The configuration of depolarizer 446 may be selected from a ½ wave plate, ¼ wave plate, multiple order or zero order plate or any other birefringent component.

Figure 5:
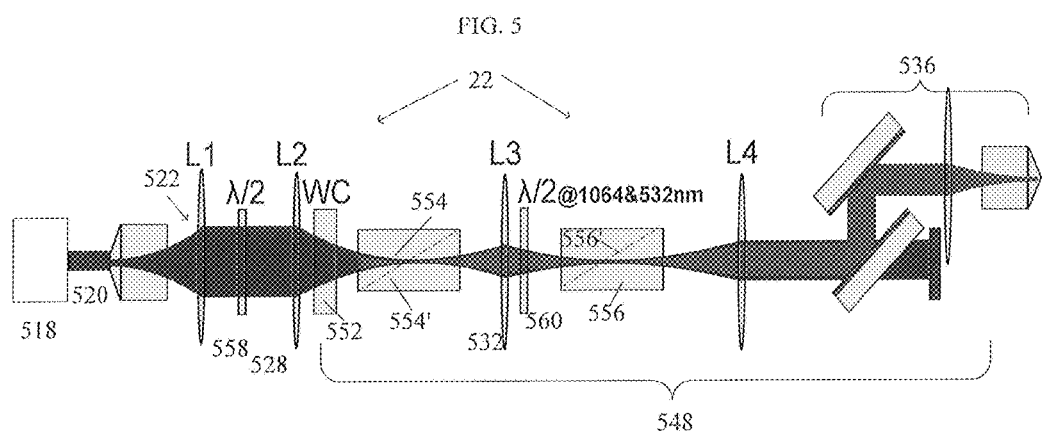

FIG. 5, shows BB Green laser 22 generating SM BB Green light with a spectral linewidth $\Delta\lambda$ exceeding 3 to 5 nm range at high efficiency between 40 and 70%. The Green laser 22 includes SM BB Yb fiber laser 518 functioning as the pump for signal light, focusing lens 528 and output collimating unit 536 all configured identically to those of FIG. 4. The pump pulses out a SM randomly polarized IR pump light in a 1-micron range having a broad spectral linewidth above 10 nm. The pump light is collimated in input collimating unit 524 and focused by output focusing lens 528 to further undergo frequency conversion in an SHG scheme 548. In contrast to FIG. 4, SHG 548 here includes type II LBO crystals.

The type II upstream LBO 554 crystal is placed along the path of focused IR pump signal light so that its waist extends within the bulk of upstream nonlinear crystal 554 and is located roughly in the center of this crystal. As discussed above, the tightly focused light produces the Rayleigh length which is smaller than the length of crystal 554 that helps overcome an inherent narrow spectral acceptance of nonlinear crystals.

The type II downstream LBO crystal 556 has its axis 556' parallel to axis 554' of upstream crystal 554 and may have the same currently optimal dimensions as the upstream crystal of FIGS. 4-7 which is 3×3×(3 to 5) mm. The downstream crystal 556 receives light from upstream crystal 554 which undergoes focusing by first intermediary lens 532 in the same manner as disclosed in regard to crystals 414, 416 (FIG. 4) and 554.

The Green laser 22 of FIG. 5 includes output and downstream ½ wave plates 558 and 560, respectfully. The output ½ wave plate 558 is located within the collimated pump light between laser head 522 and focusing lens 528, whereas downstream ½ plate 524 is located immediately output from downstream type II LBO crystal 556. These plates are desirable to prevent interference between originally generated Green light in upstream crystal 554 and secondary Green light in downstream crystal 556, which recycles the unconverted pump light, by placing these two Green beams in respective orthogonal polarization planes.

The type II crystals are typically characterized by a well pronounced spatial walk-off effect as known to the artisan. The walk off phenomenon causes transverse beam displacement. This effect shortens the interaction length between the BB depolarized pump signal light and generated Green light which detrimentally affects the conversion efficiency. To increase the interaction length, the BB depolarized pump signal light is split by walk-off compensation (WC) plate 552 which is so oriented that the extraordinary beam walks off at an angle opposite to that of upstream crystal 554. Technologically, the thickness of walk-off compensation plate 552 depends on the thickness of crystal 554 and is subject to one condition: the ordinary and extraordinary IR waves of the pump signal light overlap in the middle of the crystal.

Figure 6:
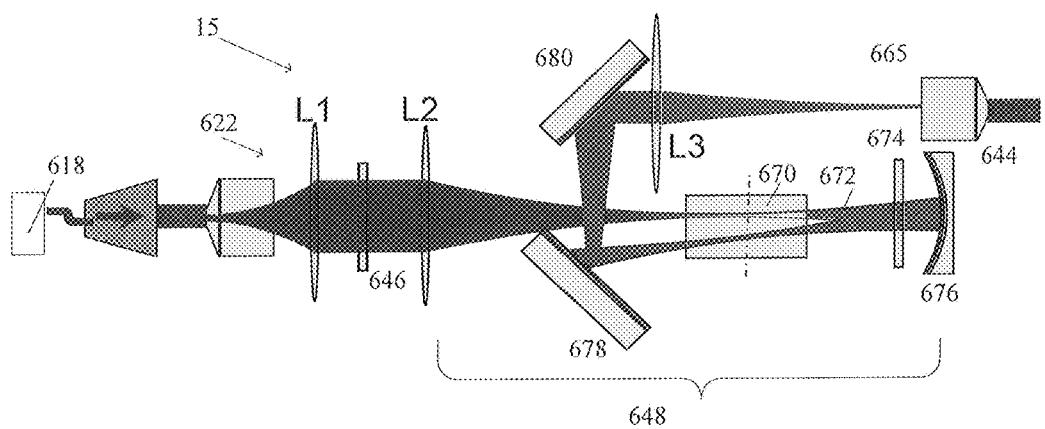

Turning now to FIG. 6, pulsed BB Green laser 22 is configured with a multi-pass architecture of type I SHG scheme 648. Having partially the same structure as that of FIG. 4, SHG 648 of FIG. 6 however does not need a downstream crystal and requires a different configuration of an output collimator 665. Both, multi-pass SHG 648 of FIG. 6 and SHG 748 of FIG. 7, each have a smaller footprint, lower cost and no achromatic elements, as for example, focusing lens 432 in FIG. 4, when compared to respective configuration in FIGS. 4 and 5.

The operation of Green laser 22 of FIG. 6, including IR BB Yb signal light fiber laser 618, input IR collimator, and depolarizer 646, is the same as that of FIG. 4. Even the first pass of the depolarized focused pump light through LBO crystal 670 has substantially the same characteristics, as those of Green laser 22 in FIG. 4, except for its propagation in a plane which is laterally offset from the median plane defined between two opposite faces of the crystal. The plane of propagation of pump signal light through the crystal is rather a choice of design.

The alternative design for the multi-pass architecture of type I SHG 648, as shown in FIG. 6, begins with an output beam 672 leaving LBO crystal 670. The output beam 672, including the originally converted Green and an extraordinary wave of the pump light, is incident on a ¼ wave plate 674 and further on a high reflectivity relay imaging spherical mirror 676. The latter is configured to relay beam 672 in the backward propagation direction through the same ¼ wave plate 674 before the reflected beam impinges upon the opposing face of LBO crystal 670. While the wave plate 674 is configured as a ¼ wave plate, it operates as a ½ plate because of the double pass of light through it in the opposite direction. As a consequence, this plate in combination with depolarizing plate 646 creates favorable conditions preventing the interference between the originally and secondary generated Green beams and a substantially noiseless output of cumulative Green light. The output Green light with the average power equal to the sum of originally and secondary generated Green beams is further reflected by two spaced mirrors 678 and 680, focused and then collimated in output collimating unit 665 to be further guided in fiber 644.

Figure 7:
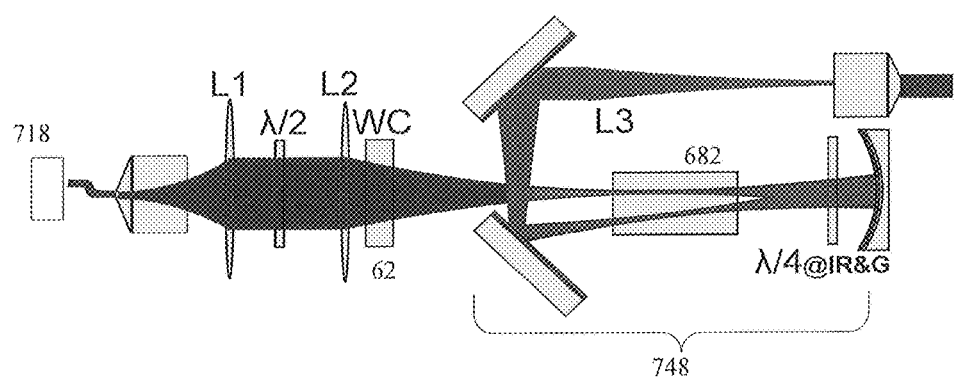

Turning to FIG. 7, multi-pass type II SHG 748 of the inventive Green laser 22 has all the components of the inventive Green laser 22 of FIG. 6. However, due to the walk-off phenomenon in type II crystal 682, this architecture also incorporates walk-off compensation plate 662 for the same reasons as explained above in regard to FIG. 5.

Figure 8:
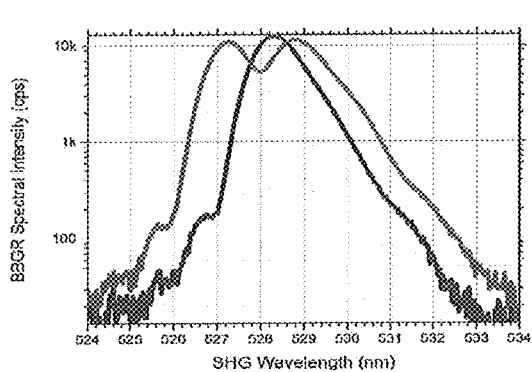
FIGS. 8 and 9 illustrate computer generated Green light spectra for a single and multiple Green lasers of FIGS. 4-7.
Figure 9:
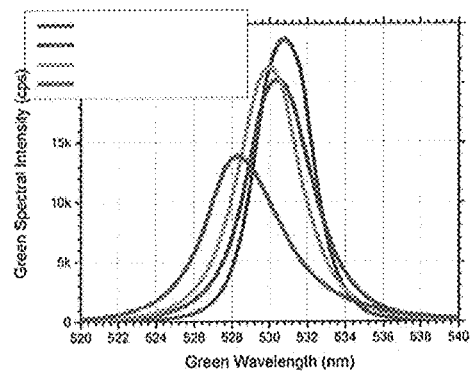

Referring to FIGS. 8 and 9 graphically summarizing the above-disclosed single Green laser 15 is configured to output broadband Green light with a 4 to 5 nm spectral bandwidth at HWFP, as shown in FIG. 8. If several Green lasers 15 constitute a single Green light source for each channel, the linewidth can be increased to 8-10 nm. Also Green laser 15 enables tunability of laser line bandwidth characteristics and fine ±0.5 nm adjustment of the peak wavelength which ranges in central at FWHM. The pulses may range between hundreds of watts and a few kW of average power and tens of kW of peak power. In other words, the average power of Green light generated by Green laser 15 is limited only to the power of its pump.

Red Laser

The basic goal attached by the disclosed Red laser is to produce a laser beam of red color with a broad spectral line sufficient to minimize speckle noise on the illuminated digital display and, of course, high brightness. This is attained by the disclosed red fiber laser based on two main premises: 1. Raman converter emitting light at the desired Raman-shifted wavelength in a 1220-1300 nm emission wavelength range with a broad spectral line of up to 25 nm in a Raman fiber, and 2. The spectral acceptance of the broad spectral line at the desired Raman-shifted wavelength within the above-identified emission spectrum by an LBO nonlinear crystal to produce red light within a 610-650 nm wavelength range with a spectral linewidth between 4 and 5 nm at FWHM for a single Red laser and between 8-10 nm for multiple Red lasers. The practical implementation of the disclosed source operative to output high power diffraction-limited broadband red light is realized by two embodiments utilizing Raman Scattering and Sum frequency nonlinear effects to produce red light at respective central 615 nm and 635 nm wavelengths.

Referring now to the drawings, FIG. 10 illustrates the basic layout of the disclosed red light laser 1010 based on a harmonic generation scheme which includes a Raman converter 1014 in combination with a standard LBO nonlinear crystal 1016 within a frequency conversion scheme, known to one of ordinary skilled in the laser art, to output pulsed red light at a central wavelength at about 615 nm. A seed 1018-1022 defines the temporal characteristic of Raman gain by outputting IR pulsed light at a pump wavelength selected from a 1030-1120 nm wavelength range and, in this embodiment, has a MOPFA configuration. In particular, pump 1012 includes a tunable pump seed/master oscillator configured as a broad spectral line SM diode laser 1018 with a polarization maintaining (PM) fiber pigtail which is operative to emit a train of pulses in a picosecond-nanosecond (ps-ns) pulse width range. The pulsed pump light is then coupled into an Yb fiber laser amplifier or booster stage 1022 which is configured to boost the pulsed pump light up to a multi kW peak power level at the desired IR pump wavelength. Optionally, the IR pump laser source may include one or more pre-amplifying stages 1020 each configured with an Yb-doped PM fiber and gradually amplifying the pump seed signal before it is coupled into power amplifier or booster 1022. The amplifying stages each include a gain block configured with a housing which encases an Yb doped active fiber 1024 spliced at its opposite ends to respective SM PM passive fibers that may terminate outside the housing. The pumps of respective Yb doped fibers 1024 include respective one or more diode laser pumps operating in a CW regime.

The broad linewidth red light laser 1010 is configured with the pump source operating in a quasi-continuous wave (QCW) regime which is provided by coupling the output of oscillator 1018 to a separate electro-optic intensity modulator for setting the pulse or directly modulating the oscillator for setting a pulse width. The pulsed pump light is output at a repetition rate in a 1 to 100 MHz frequency range, wavelength selected from a 1030-1120 nm range and with a pulse duration in a ns-ps range. The preamplifier stage 1020 is configured to output pulsed pump light at an average power of about 1 W before power amplifier stage 1022 boosts the average power of the pulsed pump light to about 200 W and higher. The Raman converter 1014 may include a multi-meter-long nonlinear passive fiber having a multi-micron core diameter. In the schematic of FIG. 10, about 50-80% of the output IR pump light may be converted to the third or fourth Stokes order at about 1230 nm wavelength depending on the pump wavelength of seed 1018. The SM pulsed light at the 1230 Raman-shifted wavelength after being frequency doubled in 1020 mm long LBO 1016 produces the visible spectrum shown in FIG. 11A with a central wavelength around 615 nm and a spectral bandwidth of more than 4 nm which is sufficient to substantially minimize speckle noise. In the configuration including multiple Red lasers of FIG. 3A, the central line may reach a 8 nm width, as shown in FIG. 11B.

One of the keys to power scaling of red light generator 10 lies in the increased core size of all active and passive large mode area fibers. For example, the core size may be 20 microns which would allow a clean Raman spectrum to be produced at 15-20 kW IR peak power or more. The increased IR peak power, as one of ordinary skill readily realizes, significantly increases the conversion efficiency. For the suggested large mode area fibers, the conversion efficiency from 1060 nm to 615 nm may approach 25%.

Still another approach to the power scaling of red light generator 10 includes increasing the average power by controlling the duty cycle of the IR pump. In particular, the repetition rate of the pump seed 1018 of FIG. 10 can be increased leading to the increased pump power while keeping the peak power constant.

FIG. 12 illustrates a modification of broad line Red laser shown in FIG. 10. Similar to the basic layout, here red light laser 1210 is configured with a pump having a MOPFA configuration and operating in QCW regime. The pump includes master oscillator 1018 which output is modulated to generate a train of pulses in a 1030-1120 nm wavelength range. One or more pre-amplifying and booster cascades each are configured with an Yb doped fiber pumped by a laser diode pump which operates in a CW regime. The amplifiers 1020 and 1022 sequentially increase the power of pulsed pump light which is further coupled into Raman converter 1014 where it is effectively converted to sequential Stokes orders with the third Stokes order being the desired 1220-1300 nm wavelength range and a broad spectral linewidth. The single pass SHG 1016 including an LBO crystal is configured with a broad spectral acceptance at the desired Raman-shifted wavelength that covers at least a substantial part of the spectral linewidth of the IR light within the desired Raman-shifted wavelength range.

The linewidth of the IR light in the desired 1220-1300 nm Raman-shifted wavelength range may still be excessively broad and detrimentally affect the conversion efficiency despite the broadband spectral acceptance range of the LBO. In this case, the 3rd Stokes order may be narrowed by pumping single pass Raman converter by light from a broadband SM Raman seed 1028 operating in a CW regime at a wavelength which is selected from a band of wavelengths of the second Stokes order. By doing so, the 2d Stoke is amplified by stimulated Raman scattering which decreases the linewidth of this Stoke. As a result, the linewidth of the 3 Stoke narrows. In this schematic, temporal characteristics are determined by the pump seed 1018, while the spectral properties of the light at the Raman-shifted wavelength are determined by the CW Raman seed 1028. Accordingly, the wavelength and linewidth of the Raman seed's SM output can be tailored to a specific linewidth within the desired 1220-1300 nm wavelength range.

Figure 13:
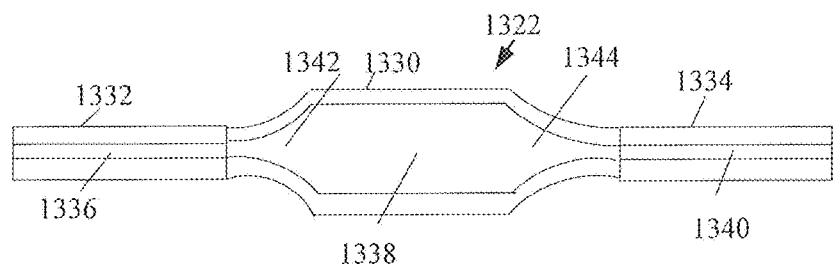
FIG. 13 is configuration of fiber amplifier used in all Green and Red lasers of the present disclosure.

FIG. 13 illustrates booster 1322 configured as a fiber or gain block which includes a housing (not shown) encasing input and output identically dimensioned SM PM passive fibers 1332 and 1334 that are spliced to respective opposite ends of PM Yb-doped silica fiber 1330. The latter has a MM core 1338 capable of supporting a SM at the pump wavelength and including opposite uniformly-dimensioned core ends which are configured so that an MFD of a fundamental mode (FM) matches an MFD of SM pump light guided by respective SM fibers 1332 and 1334. The use of MM fibers somewhat disturbs polarization. The matching MFD diameters of respective SM and FM and adiabatically expanding and narrowing mode-transforming regions 1342, 1344 respectively of MM core 1338 provide the excitation and support of only one FM.

Figure 14:
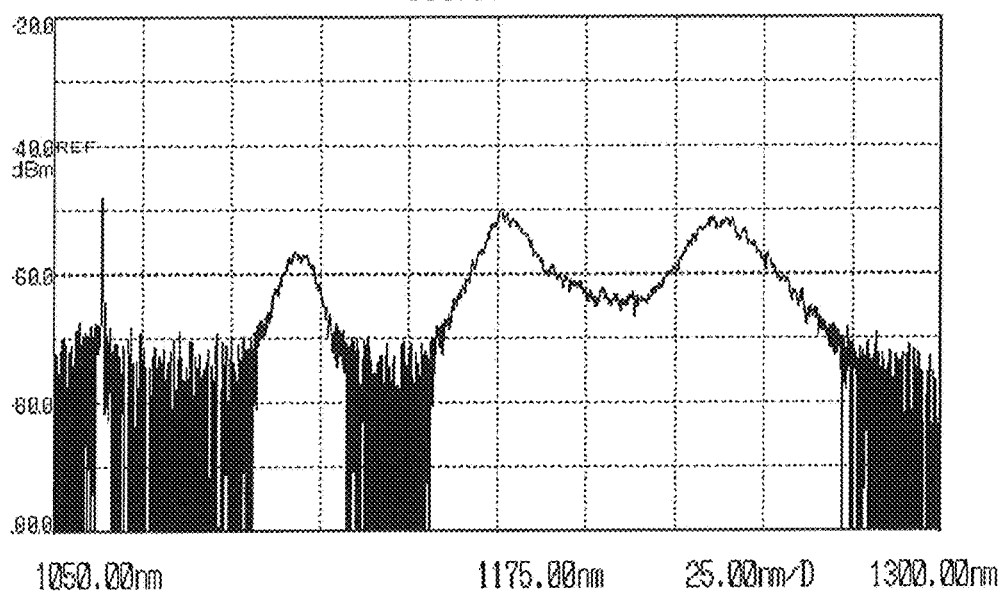
FIG. 14 is a computer generated spectrum of the Raman converter.

Returning to FIG. 12, CW SM Raman seed 1028 can be configured as a broadband Fabry-Perot fiber or diode laser, distributed Bragg reflector (DBR) or distributed feedback laser (DFB) or wavelength-stabilized laser seeding Raman converter 1014 at intermediate Stokes. In particular, Raman seed 1028 emits light at a Raman-shifted wavelength which is selected from in a 1130-1175 nm wavelength range of the 2 Stokes order of Raman converter 1014. The outputs of respective pump and Raman seed sources are combined in a fiber WDM 1026 located preferably, but not necessarily upstream from booster 1022 which amplifies only pump seed light at 1064 nm wavelength to about 20-30 W average power and 5-10 kW peak power. The Raman spectrum is illustrated in FIG. 14 with the linewidth of the 3 Stoke of about 25 nm.

The Raman converter 1014 is configured with a SM PM passive fiber with a length greater than 5 meters and the overall wall plug efficiency in a 6-20% range. For example, this passive fiber may be from 30 to 100 meter long SM PM passive fiber operating at a high 50-80% Raman conversion efficiency which, in this example, translates to up to 6 kW peak power Raman-shifted light at the desired 1230 nm wavelength. The single pass SHG includes LBO 1016 dimensioned to be 40 mm long, 5 mm wide and 3 mm thick I type crystal operating at about 35-50% SHG efficiency. The average power of SM Red light at about 615 nm wavelength is within a 45-110 W range, whereas its peak power varies between 1.1 and 2.8 kW.

Both of the above-disclosed configurations of the wideband Red light generator, based on a Raman converter and single pass SHG wavelength conversion scheme, utilizes a SM PM silica-core passive nonlinear fiber for the disclosed Raman converter. However, silica-based fibers are not the only choice to produce the IR light in a 1220-1300 nm range. A viable alternative to silica fibers includes the use of fibers with a phosphate glass core which produce a substantially wider 1 Stokes order than a standard silica-core fiber. In fact so much broader that the desired 1220-1300 Raman-shifted wavelength band is covered by the $1^{st}$ Stoke.

Figure 15:
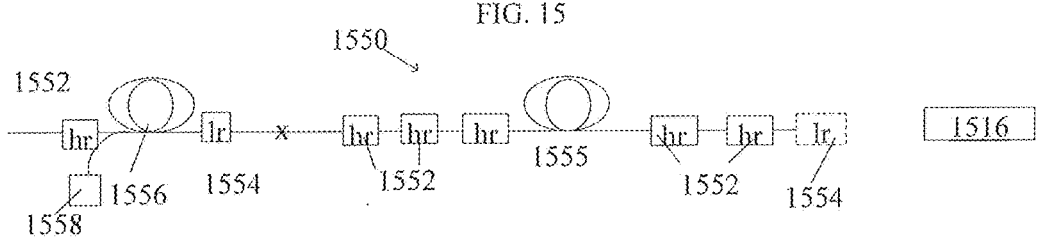
FIGS. 15 and 16 illustrate respective embodiments of the Red laser.

A further embodiment illustrating a cascaded Raman fiber laser is illustrated in FIG. 15. The principle of this embodiment is to convert a wavelength of the output of rare-earth doped fiber laser pimp to the required Red light output wavelength using a series of Raman Stokes shifts. Conventionally, wavelength conversion over two or more Stokes shifts is performed through the use of a cascaded Raman resonator. It is comprised of nested cavities at each of the intermediate wavelengths made with high reflectivity fiber Bragg gratings or reflectors 1552. Each intermediate wavelength in the resonator is chosen to be close to the peak of the Raman gain of the wavelength preceding it. A low reflectivity output reflector or coupler 1554 terminates the wavelength conversion which is selected from 1220-1300 nm range of wavelengths.

The disclosed red light laser 1550 includes a broadband QCW Yb-doped fiber oscillator 1556 with seed diode laser 1558 outputting signal pump light at the desired pump wavelength into a cavity of Yb fiber oscillator 1556 which is defined between a high reflector (HR) 1552 and low reflector (LR) 1554. In contrast to all Yb-doped fibers used in the above-disclosed configurations, the Yb-doped fiber 1556 may or may not a PM fiber. The pump is operative to output long microsecond pulses at the desired pump wavelength.

The signal pump light is further coupled into a multi-cascaded SM LP Raman laser 1555 provided with multiple HRs 1552 and downstream LR 1554 providing generation of three Stokes with the 3rd Stoke at the desired Raman-shifted wavelength range coupling out from the cavity either with or without LR 1554. The Raman-shifted pump light emitted from Raman laser 1555 is characterized by a broad spectral line spectrally accepted by LBO 1516 which is operative to generate SM Red light with a broad spectral linewidth of at least about 5 nm in a 1220-1300 nm wavelength range.

Figure 16:
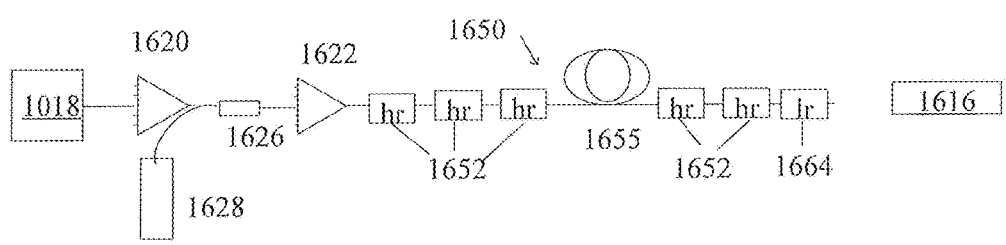

FIG. 16 illustrates Red laser 1650 with the QCW light pump having a MOPFA configuration which has pump seed 1018 and one or more amplifying stages 1620 and 1622. The booster stage 1622 is based on the same fiber configuration as shown in FIG. 13. The rest of components correspond to respective components of the Red laser of FIG. 13 and includes broadband Raman seed diode laser or seed 1628 and WDM 1626. The amplified pump light at the desired pump wavelengths is combined in WDM 1626 with the light from Raman seed 1628 generated at the desired Raman-shifted wavelength which is selected from a 1220-1300 nm wavelength range. The amplified pump light and Raman-shifted light is then coupled into Raman laser 1655 configured with a series of HRs 1652 and an output LR 1664. The light at the Raman-shifted wavelength is converted in the SHG with LBO 1616 to the desired broadband Red light at about 615 nm.

FIG. 17 illustrates the advantages of the disclosed single Red Laser at 615 nm generated by all of the above disclosed optical schemes. As can be seen the central wavelength 615 nm has a very stable character with a slight 0.5 nm increase at 30 W. The spectral linewidth is also stable varying between 2.5 and 3.5 nm over a 35 W red output power range. The linewidth can be increased to 4 to 5 nm for a single Red laser and 8 to 10 nm for multiple Red combined together as shown in FIG. 3 without substantial modification of the shown configurations. As can be readily apparent to one of ordinary skill in the laser arts, the above disclosed schemes can used for generating Red light at longer central or fundamental wavelengths with the Red wavelength interval.

Referring to FIG. 18, pulsed Red laser 1850 with architecture different from the above disclosed schemes is operative to output red light at around 635 nm wavelength. The human eye is more responsive to light at 615 nm than to light of 635 nm. However, the efficiency of light generation at 635 nm is higher than that of 615 nm.

In Red laser 1850, the 635 nm wavelengths is generated by employing frequency mixing of the seeded Yb and erbium (Er) fiber pumps. Both pulsed Yb and Er pumps utilize respective single diode lasers at 975 nm seeding respective one- or multi-amplifying stages 1800 and 1802 nm respectively. The outputs of Yb and Er fiber pumps are focused by respective lenses 1804 on input mirrors 1805 and 1806 with the Er beam bouncing from input mirror 1805 towards input mirror 18006 which is transparent to the Yb beam. Each booster 1800, 1082 can be configured in accordance with the booster of FIG. 13 and output respective high peak power light signals reaching tens of kW. Both Yb and Er beams further propagate through an LBO 1812 in which their respective frequencies are summed. As a result, red light at 1535 nm is reflected from mirror 1808, which is transparent to unconverted light in LBO 1812, to output coupler 1810.

FIGS. 19 and 20 are illustrative of Red light beam characteristics generated by the schematic of FIG. 18. As can be seen from FIG. 19, the spectral linewidth is about 4-5 nm for a single Red laser. As to FIG. 20, the central wavelength is about 634.2 nm±0.1 nm, whereas the spectral linewidth varies in a 3.1 nm±0.9 nm which is more than adequate for the efficient suppression of speckles. Thus, the Disclosed Red laser at 635 nm delivers a bright stable central wavelength and linewidth over a wide range of laser operating conditions.

Blue Laser

Figure 21:
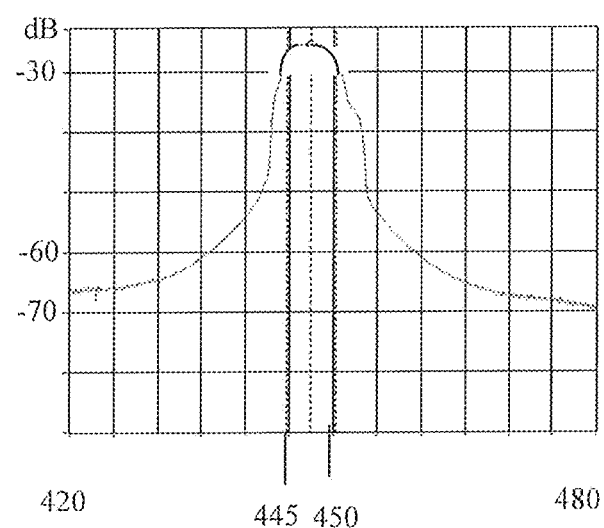
FIG. 21 is a graph illustrating a linewidth of the Blue laser of the inventive RGB light source.

The blue laser 26 of FIG. 2B includes a plurality of multimode (MM) diode lasers. The diode lasers are grouped in one or more modules each of which may house, for example, 6 or 12 diode lasers. The output power of each module can reach up to approximately 40 W and the desired power requirements can be met by packaging several modules together. For practical considerations, the output power of blue laser 26 can vary for example between 100 and 500 W. The blue laser 26, like the previously disclosed Green and Red lasers, has a stable central wavelength varying between 440 nm and 470 nm. True to the ultimate goal—speckle suppression—Blue laser 26 outputs light having a stable broad bandwidth between about 4 nm and 8 nm, as can be seen in FIG. 21.

Overview

Referring to FIGS. 3 and 4, RGB laser source 15 is easy to power scale, easy to control the desired settings and, if need arises, modulate the latter. In summary, the inventive RGB laser source for a digital cinema and the like preferably has two RGB sets each including Red, Green and Blue channels. The brightness of randomly polarized light beam of inventive source 15, which can operate in CW/QCW/Pulses regimes, may reach about 150 klm.

The Green laser 22 with a pulsed Yb fiber pump is operative to output Green light with a stable central wavelength in 524-546 nm wavelength range and spectral bandwidth of about 4-5 nm for single and about 8-10 nm for multiple Green lasers at FWHM produced by a randomly polarized output beam. The pulse repetition rate varies in a MHz range. The average power of Green laser 15 is limited only by the average power of the IR pump and can reach 1 or even a few kWs.

The Red laser 24 outputs a stable signal in a 615-645 nm central wavelength with a stable spectral linewidth of 4-5 nm for a single and about 8-10 nm for multiple Red lasers. The repetition rate of Red laser operating preferably in a QCW or pulsed regime varies in a MHz range. The output average power of the laser 24 may reach up to 500 watt range being at the present desired.

The Blue laser is configured with multiple MM diode lasers arranged in groups of 6 or 12 which are housed together to determine a module. The Blue laser 28 may output light of up to several hundreds of watts, such as 200 W and higher. The central wavelength may be selected in 430-470 nm wavelength range with the stable spectral linewidth of 4-5 nm for a single and 8-10 nm for multiple diode lasers of a single module.

Having described the embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A Red Green Blue (RGB) laser light source for luminaire projector system, comprising at least a first channel configured with:
   a randomly polarized (RP) broadband (BB) single mode (SM) Green laser including
      a master oscillator power fiber amplifier (MOPFA) pump which is operative to output a pulsed RP BB SM pump beam at a fundamental wavelength in a 1 μm wavelength range, and
      a second harmonic generator (SHG) which is configured with a lithium triborate (LBO) nonlinear crystal receiving the SM BB pulsed pump beam and outputting a train of pulses of BB Green light in a 5xx nm wavelength range, a broad spectral linewidth $\Delta\lambda_1$ of at least 4 nm;
   an RP BB SM Red laser configured with respective quasi continuous wave (QCW) fiber laser pump which is operative to output a RP SM BB pulsed pump beam at a central wavelength, and a frequency converter with an LBO nonlinear crystal receiving the RP SM BB pulsed pump beam so as to output a train of pulses of red light in a 6xx nm wavelength range with a broad spectral line $\Delta\lambda_2$ of at least 4 nm; and
   a blue-light laser outputting RP Blue light at a central wavelength in a 4xx nm wavelength range with a broad spectral linewidth $\Delta\lambda_3$ of at least 4 nm.

2. The RGB light source of claim 1 further comprising a second channel including the RP BB SM Green, Red and Blue lasers outputting respective RGB lights at central wavelengths which are different from respective central wavelengths of the first channel for outputting a 3D image.

3. The RGB light source of claim 2 further comprising multiple monochromatic Red, Green, and Blue combiners each receiving light from respective multiple Red lasers, multiple Green lasers and multiple Blue lasers in each of the first and second channels and configured to output respective cumulative Red, Green and Blue light each with the broad spectral line of at least 8 nm, and a plurality of downstream combiners each receiving respective Red, Green and Blue cumulative lights from the respective first and second channels and operative to output randomly polarized (RP) white light.

4. The RGB light source of claim 1 or 2 further comprising a projector operative to output a 2D or 3D image.

5. The RGB light source of claim 1, wherein the RP BB SM Green laser further includes a focusing optic configured to focus the RP BB SM pulsed pump beam to a beam waist diameter not exceeding 40 μm within the LBO.

6. The RGB light source of claim 5, wherein the SHG is configured as a single pass conversion scheme and has upstream and downstream type I LBO crystals with respective axes which extend in perpendicular planes, and a first focusing lens focusing an output from the upstream type I LBO crystal within a bulk of the downstream type I LBO crystal which is configured to output a cumulative RP BB SM Green light and unconverted RP BB SM pump beam in the upstream type I LBO crystal.

7. The RGB light source of claim 6 further comprising an output collimating unit operative to output cumulative RP BB SM Green light with an output average power equal to a sum of Green light generated in the upstream and downstream type I LBO crystals, the output collimating unit including a wavelength discriminator transparent to unconverted RP BB SM pump beam in the downstream type I LBO crystal and reflecting the cumulative RP BB SM Green light along an output path along which a high reflectivity mirror guides the cumulative BB Green light to a downstream focusing lens to focus the cumulative BB Green light in an output collimator.

8. The RGB light source of claim 6 further comprising a birefringent depolarizer located downstream from the upstream type I LBO crystal, the RP BB SM Green lights from respective upstream and downstream type I LBO crystals propagating without interfering with one another.

9. The RGB light source of claim 5, wherein the SHG of the Green laser further comprises a pair of upstream and downstream spaced type II LBO crystals having respective axes which extend in parallel planes, upstream and downstream ½ wave plates located upstream from respective first and second type II LBO crystals and configured to prevent interference between RP BB Green lights from the respective upstream and downstream type II LBO crystals, a walk-off compensation plate made from birefringent material and located upstream from the first type II LBO crystal, the walk-off compensation plate being configured to provide a walk-off of an extraordinary pump wave in a direction opposite to that provided by the first type II LBO crystal, an output collimating unit operative to output cumulative RP BB Green light with an output average power equal to a sum of Green light generated in the upstream and downstream second type II LBO crystals, the collimating being provided a wavelength discriminator transparent to any RP BB SM pump beam unconverted by the second type II LBO crystal and reflecting the cumulative BB Green light along an output path.

10. The RGB light source of claim 5, wherein the SHG of the RP BB SM Green laser includes a type I LBO crystal and is configured to operate as a multi pass frequency conversion scheme which is provided with:
   a high reflectivity concave reflector located downstream from the type I LBO crystal along a forward propagation light path to receive therefrom any unconverted RP BB SM pump light and RP SM BB Green light, the high reflectivity concave reflector being configured to back reflect the received light along a backward light propagation light path through the type I LBO crystal for converting the unconverted RP SM BB pump light into RP SM BB Green light, wherein the forward and backward propagation light paths do not cross one another within the type I LBO crystal, and a Green light collimator receiving and outputting Green light converted in the forward and backward directions.

11. The RGB light source of claim 5, wherein the SHG of the RP BB SM Green laser further comprises a walk-off plate located upstream from a type II LBO crystal, the SHG being configured to operate as a multi pass frequency conversion scheme which includes:
   a high reflectivity concave reflector located downstream from the type II LBO crystal along a forward propagation light path to receive therefrom the unconverted RP BB SM pump light and RP SM BB Green light, the high reflectivity concave reflector being configured to back reflect the received light along a backward light propagation light path through the type II LBO crystal for converting the unconverted RP SM BB pump light into RP SM BB Green light, wherein the forward and backward propagation light paths do not cross one another within the type II LBO crystal, and a Green light collimator receiving and outputting Green light converted in the forward and backward directions.

12. The RGB light source of claim 1, wherein the QCW fiber laser pump of the RP BB SM Red laser is configured with a MOPFA scheme including a single diode laser oscillator and SM ytterbium ("Yb") power amplifier fiber laser, the QCW fiber laser pump being operative to emit pulsed pump light in a SM at a wavelength between 1030-1120 nm;

the frequency converter being configured as a single-pass SM fiber Raman converter spliced to an output of the Yb power amplifier and having a core guiding the pulsed pump light, and a cladding surrounding the core, wherein the Raman converter induces an "n" order frequency Stokes shift of the pulsed pump light to output the pump light at a desired Raman-shifted wavelength which varies between 1220 and 1300 and has a broad spectral line of at least 10 nm, wherein "n" is an integer.

13. The RGB light source of claim 12, wherein the Raman converter is configured with a PM fiber having a silica core in a silica cladding or a phosphate glass core, the Raman converter with the silica core having a length sufficient to induce a third or fourth order frequency Stokes to convert the pump wavelength to the desired Raman-shifted wavelength, the Raman converter with the phosphate glass core being configured with a length sufficient to induce a first order frequency Stoke to convert the pump wavelength of the pump light to the desired Raman-shifted wavelength.

14. The RGB light source of claim 12 further comprising a seed operating in a continuous wave (CW) regime to emit the light at the desired Raman-shifted wavelength which is coupled into the single pass SM Raman converter.

15. The RGB light source of claim 14 further comprising a wavelength-division multiplexing (WDM) which multiplexes the pump light and light at the desired Raman-shifted wavelength either upstream from or downstream from the Yb power amplifier fiber laser.

16. The RGB light source of claim 12, wherein the single-pass Raman converter operates with a conversion efficiency within a 50-80% range, and an overall wall plug efficiency of the RGB light source varies within a 6-20% range.

17. The RGB light source of claim 1, wherein the QCW fiber laser pump of the RP BB SM Red laser is configured with Yb and erbium (Er) fiber pump sources each having a MOPFA scheme including a single diode laser oscillator and power amplifier fiber laser, the QCW fiber laser pump being operative to emit two pumped pump lights each in the SM at 10xx nm and 15xx nm wavelengths, respectively;

the frequency converter being configured as a multi pass conversion scheme with the LBO nonlinear crystal providing sum-frequency of the Yb and Er pump lights to output Red light in the 6xx nm wavelength range.

18. The RGB light source of claim 1, wherein the pumps of the Green and Red lasers are configured with MM gain medium capable of supporting only a SM.

* * * * *

UNITED STATES PATENT AND TRADEMARK OFFICE
CERTIFICATE OF CORRECTION

PATENT NO. : 10,170,886 B2  
APPLICATION NO. : 15/511826  
DATED : January 1, 2019  
INVENTOR(S) : Leonardo et al.

Page 1 of 1

It is certified that error appears in the above-identified patent and that said Letters Patent is hereby corrected as shown below:

On the Title Page

Item (72) Inventor is corrected to read:
-- Manuel Leonardo, Santa Clara CA (US);
Igor Samartsev, Westborough, MA (US);
Alexey Avdokhin, Southborough, MA (US);
Gregory Keaton, Oxford, MA (US);
Andreas Vaupel, Longmeadow, MA (US);
Pancho Tzankov, Cupertino, CA (US) --.

Signed and Sealed this
Twenty-seventh Day of September, 2022

Katherine Kelly Vidal
*Director of the United States Patent and Trademark Office*